(12) United States Patent
Guo et al.

(10) Patent No.: US 11,618,116 B2
(45) Date of Patent: Apr. 4, 2023

(54) SUPPORTING DEVICE AND METHOD FOR LARGE THIN-WALLED PART

(71) Applicant: DALIAN UNIVERSITY OF TECHNOLOGY, Liaoning (CN)

(72) Inventors: Jiang Guo, Liaoning (CN); Bin Wang, Liaoning (CN); Chuanping Song, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 148 days.

(21) Appl. No.: 17/424,392

(22) PCT Filed: Feb. 17, 2020

(86) PCT No.: PCT/CN2020/075486
§ 371 (c)(1),
(2) Date: Jul. 20, 2021

(87) PCT Pub. No.: WO2020/168995
PCT Pub. Date: Aug. 27, 2020

(65) Prior Publication Data
US 2022/0088731 A1    Mar. 24, 2022

(30) Foreign Application Priority Data
Feb. 19, 2019 (CN) .......................... 201910124314.5

(51) Int. Cl.
*B23Q 3/08* (2006.01)
*B23Q 3/06* (2006.01)
*B23C 3/00* (2006.01)

(52) U.S. Cl.
CPC ................ *B23Q 3/086* (2013.01); *B23C 3/00* (2013.01); *B23Q 3/065* (2013.01); *B23C 2220/48* (2013.01)

(58) Field of Classification Search
CPC ....... B25B 11/002; B23Q 3/062; B23Q 3/065; B23Q 3/15; B23Q 3/154–1546
See application file for complete search history.

(56) References Cited

U.S. PATENT DOCUMENTS

| | | | | |
|---|---|---|---|---|
| 5,971,835 | A | * 10/1999 | Kordonski | ................ B24C 3/18 451/36 |
| 6,267,364 | B1 | * 7/2001 | Zhang | ................... B25B 11/002 269/7 |
| 2016/0052147 | A1 | * 2/2016 | Spicer | .................. B23Q 3/1546 269/8 |

FOREIGN PATENT DOCUMENTS

| CN | 101579833 A | 11/2009 |
|---|---|---|
| CN | 108620911 A | 10/2018 |

(Continued)

OTHER PUBLICATIONS

Office Action (with English translation) corresponding to Chinese application No. 201910124314.5 dated Aug. 23, 2019. (pp. 14).

(Continued)

*Primary Examiner* — Tyrone V Hall, Jr.
(74) *Attorney, Agent, or Firm* — Muncy, Geissler, Olds & Lowe, P.C.

(57) ABSTRACT

A supporting device and method for a large thin-walled part is disclosed. The supporting device comprises a processing device and a supporting device. A workpiece is positioned between the processing device and the supporting device and is clamped at a periphery in a flexible clamping mode. A cutter in the processing device is connected with an iron core. A coil is wound on the iron core. When the coil is energized, a magnetic field is generated around the coil. A blade part of the cutter is in contact with a processing side of the workpiece. The supporting method combines the magnetorheological fluid technology with the jet supporting technology, and uses a jet impact force to offset part of a (Continued)

milling force. The current magnitude and winding mode of the coil are changed to control magnetic field intensity. The magnetorheological fluid is cured instantly to support the workpiece.

2 Claims, 1 Drawing Sheet

(56) References Cited

FOREIGN PATENT DOCUMENTS

| | | | |
|---|---|---|---|
| CN | 109676420 | A | 4/2019 |
| DE | 29809413 | U1 | 10/1998 |
| JP | H09207039 | A | 8/1997 |
| WO | WO-2011054393 | A1 | 5/2011 |

OTHER PUBLICATIONS

Office Action (with English translation) corresponding to Chinese application No. 201910124314.5 dated Sep. 19, 2019. (pp. 14).

Notification of Grant (with English translation) corresponding to Chinese application No. 201910124314.5 dated Dec. 11, 2019. (pp. 5).

Liu Chun; "Research On Dynamics Characteristics Of Milling Titanium Alloy Thin-Walled Structure With Air Jet Assistance" Dissertation Submitted for the Application of Master's Degree of Engineering; School of Mechanical Engineering, Shandong University; May 23, 2018; (pp. 118).

* cited by examiner

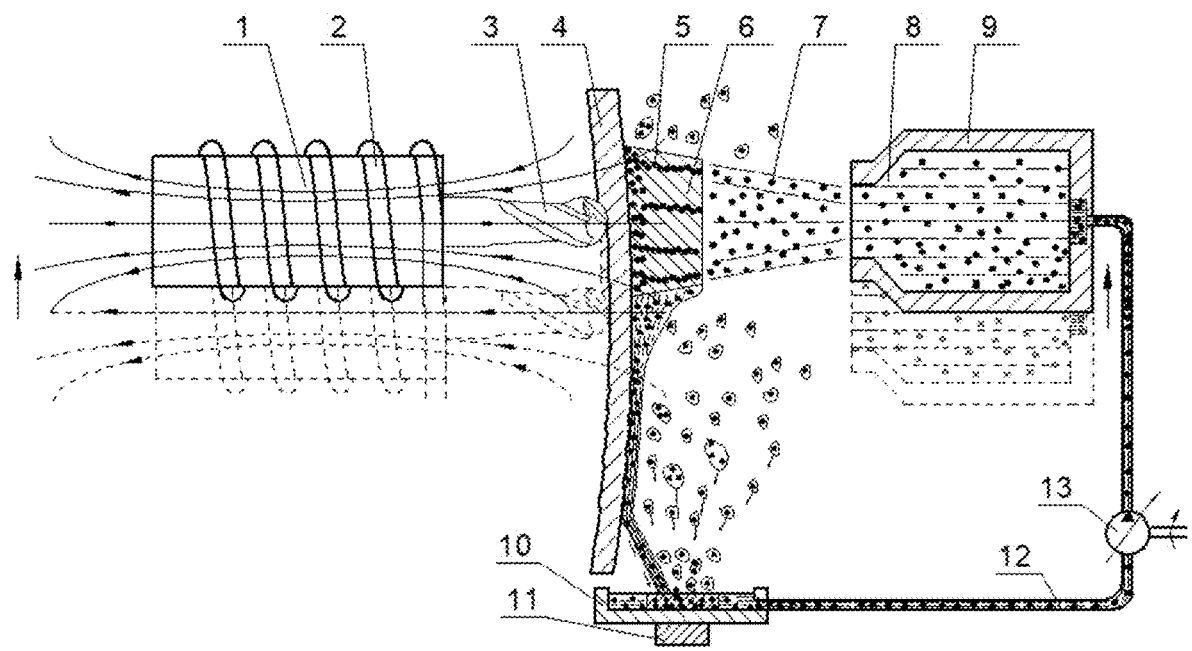

SUPPORTING DEVICE AND METHOD FOR LARGE THIN-WALLED PART

TECHNICAL FIELD

The present invention belongs to the technical field of precision machining support, and relates to a supporting device and method for a large thin-walled part.

BACKGROUND

The large thin-walled part adopts an integral structure, which reduces the assembly process of the part, has good sealing performance and high structural fatigue resistance, can keep the surface integrity and high material removal rate and is widely used in the fields of aerospace and the like. However, the large thin-walled part has not only large size, low stiffness and easy deformation, but also complicated shape, high precision requirement and large manufacturing difficulty.

At present, the mirror milling processing technology which uses a mirror supporting head to support the workpiece is an effective method to realize the machining of the large thin-walled part. In the method, two synchronous five-axis horizontal machine tools are used. One machine tool is a processing head for milling the workpiece, and the other machine tool is a supporting head for supporting the workpiece at the other side of the workpiece. The supporting head always keeps a mirror symmetry relationship with the processing head to offset the axial force during processing and reduce the deformation of the workpiece. However, the method needs two five-axis horizontal machine tools. Processing equipment is complicated, required space is large and processing cost is high. Moreover, the movement of the supporting head during processing is delayed relative to the processing head and it is difficult to control the supporting head to always keep the mirror symmetry relationship. In addition, the supporting head has certain hardness and at the same time, chips and impurities are embedded into the surface of the supporting head during processing, so that the workpiece surface is easy to be scratched and the processing quality is affected.

The magnetorheological fluid is novel controllable fluid composed of carrier fluid, magnetic particles and other additives, and is a novel intelligent material. Under the action of a magnetic field, the magnetorheological fluid can rapidly and irreversibly realize the conversion between liquid and solid within milliseconds, with high response speed and no delay phenomenon. The stiffness of the magnetorheological fluid is enhanced with the increase of external magnetic field intensity, so as to realize accurate control. Liu Haibo et al. from Dalian University of Technology have invented a magnetorheological fluid follow-up support method in the patent CN 108620911 A, which realizes follow-up support and flexible clamping for the large thin-walled part and has good clamping reliability. However, the method needs to clamp the whole part in a pool filled with magnetorheological fluid. The equipment is large, and the position of the equipment cannot be flexibly changed to adapt to the processing of various parts; meanwhile, a large amount of magnetorheological fluid is required. For the large thin-walled part with complex shape, the part has many holes and "windowing" structures, and the surface is a complex curved surface which is difficult to be sealed and vacuumed. In addition, the magnetorheological fluid in an extrusion mode can generate elastic deformation in a magnetic particle chain at an initial stage, thereby generating certain deformation and influencing the machining precision of the part. Moreover, the magnetic fluid has certain yield strength. If the milling force is too large and the curing area is small, the yield strength of the magnetic fluid may be exceeded and the workpiece cannot be effectively supported.

SUMMARY

In order to overcome the defects of the above technology, the present invention proposes a supporting device and method for a large thin-walled part. The present invention combines the magnetorheological fluid technology with the jet supporting technology to replace the traditional jet fluid with the magnetorheological fluid, and uses the impact force of the jet to offset most of a milling force. After the jet leaves a nozzle, the jet has the characteristic of keeping the original speed and pressure in an initial segment region. A distance between the nozzle and a workpiece is controlled, so that the jet is always in the initial segment region, to provide a constant jet impact force. The intensity of the magnetic field is controlled to instantly cure the magnetorheological fluid; a magnetic particle chain is formed to support the workpiece; and the supporting force is increased with the increase of the magnetic field intensity. The constant jet impact force and the controllable supporting force of the magnetorheological fluid act together to accurately offset the milling force, without exceeding the yield strength of the magnetic fluid due to excessive milling force. Meanwhile, the magnetorheological fluid has high response speed and is easy to be accurately controlled. A jet supporting head only needs to move in three directions because of the wide range of the jet action. The motion accuracy requirement for the supporting head is not high, no complicated machine tool structure is needed, and control difficulty is low. At the same time, the supporting head can move arbitrarily, not in a fixed form, and is flexible, convenient and applicable to processing of workpieces with different sizes. The magnetorheological fluid is attracted into the collecting box through a magnet and then injected into the nozzle by a hydraulic pump so that the magnetorheological fluid is conveniently recovered and can be recycled. The magnetorheological fluid has high damping and can prevent flutter during processing without scratching the surface of the workpiece.

To achieve the above purpose, the present invention adopts the following technical solution:

A supporting device for a large thin-walled part comprises a processing device, a supporting device and an auxiliary device. A workpiece 4 is positioned between the processing device and the supporting device and is clamped at a periphery in a flexible clamping mode.

The processing device comprises a cutter 3, a coil 2, an iron core 1 and a servo drive device. The cutter 3 is connected with the iron core 1 and the servo drive device, and moves under the control of the servo drive device according to a processing path. The cutter 3 is in contact with one side of the workpiece 4 to remove the material of the workpiece 4. The coil 2 is wound on the iron core 1, and plays a role of changing the current magnitude in the coil 2 to accurately control magnetic field intensity to control the magnitude of a supporting force. The coil 2 has the following functions: when the coil 2 is energized, a magnetic field of certain intensity is generated around the coil; different winding modes of the coil 2 and the current magnitude of the coil 2 are controlled to obtain a magnetic field source with controllable magnetic field shape and intensity; and when the coil 2 is not energized, the magnetic field is not generated around the coil.

The supporting device comprises a nozzle 9, magnetorheological fluid 8, magnetic particles 7, cured magnetorheological fluid 6 and a magnetic particle chain 5. The nozzle 9 is located on the other side of the workpiece 4; a through hole is arranged inside the nozzle to serve as a flow passage of the magnetorheological fluid 8; the nozzle 9 is connected with the servo drive device, and can move in three directions of X, Y and Z to ensure that the supporting device can move with the cutter 3 to offset a milling force, ensure the processing stiffness of the workpiece and reduce processing deformation. The magnetorheological fluid 8 is ejected through the nozzle 9 at certain speed and pressure and has an impact force on the workpiece 4, thereby offsetting most of the milling force. The magnetic particles 7 are dispersed in the magnetorheological fluid 8; when the coil 2 is energized, the magnetic particles 7 are gathered under the action of a magnetic field force to form the magnetic particle chain 5, so that the magnetorheological fluid 8 is converted into the cured magnetorheological fluid 6; and the cured magnetorheological fluid 6 is near the surface of the workpiece 4 and plays a supporting role on the workpiece 4.

The auxiliary device comprises a collecting box 10, a magnet 11, a hose 12 and a hydraulic pump 13. The collecting box 10 is located under a jet; and the collecting box 10 is connected with the servo drive device, and moves with the nozzle 9. The collecting box 10 collects the magnetorheological fluid 8 flowing down from the workpiece 4 and splashing in the air. The magnet 11 is located below the collecting box 10 and is used to provide a magnetic field that can attract the magnetorheological fluid 8 into the collecting box 10. The hose 12 is connected with the collecting box 10, the hydraulic pump 13 and the nozzle 9; and the magnetorheological fluid 8 is conveyed from the collecting box 10 into the nozzle to realize cyclic utilization of the magnetorheological fluid 8. The hydraulic pump 13 is connected with the hose to inject the magnetorheological fluid 8 into the nozzle 9 at certain speed and pressure.

A supporting method for a large thin-walled part based on the processing device and the supporting device comprises the following steps:

Step 1: setting the magnitude of a jet impact force according to a magnitude of a milling force, so that the jet impact force can offset most of the milling force; meanwhile, calculating a length of an initial segment region of a jet; wherein the length of the initial segment region of the jet is roughly equal to 100 times of diameter of the nozzle, and obtaining a size of an initial jet area according to the diameter of the nozzle.

Step 2: according to the mutual offset between the sum of the magnetic field force and the jet impact force and the milling force, obtaining the magnitude of a required magnetic field force; designing required magnetic field intensity and current, as well as the number of turns and arrangement mode of the coil 2 according to the magnitude of the magnetic field force; and installing the coil 2 according to the required magnetic field.

Step 3: energizing the coil 2 to generate the magnetic field, and moving the cutter 3 to an initial processing position.

Step 4: controlling the nozzle 9 to move to the other side of the cutter 3 relative to the workpiece 4 through a servo drive mechanism, and ensuring that a distance between the nozzle 9 and the workpiece 4 is within the area of an initial jet segment; starting the hydraulic pump 13 to eject the magnetorheological fluid 8 from the nozzle 9 at certain pressure and speed; then curing the magnetorheological fluid 8 under the action of the magnetic field to support the workpiece 4; installing the magnet 11 on the collecting box 10; and moving the collecting box by the servo drive device to ensure that the collecting box is always under the jet.

Step 5: controlling the cutter 3 to conduct processing according to a certain processing track and attitude by the servo drive device, and simultaneously controlling the nozzle 9 to move with the cutter 3 to realize follow-up support for the workpiece 4.

Step 6: after the end of the processing, deenergizing the coil 2, and moving the cutter 3 to an initial position; closing the hydraulic pump 13; and stopping ejecting the magnetorheological fluid 8 by the nozzle 9, while moving to the initial position.

Compared with the prior art, the present invention has the following beneficial effects:

The present invention can use the impact force of the jet to offset most of the milling force. The magnetic field intensity is controlled to control the magnitude of the supporting force of the cured magnetorheological fluid on the workpiece to accurately offset the milling force, without exceeding the yield strength of the magnetic fluid due to excessive milling force. Meanwhile, the magnetorheological fluid has high response speed and is easy to be accurately controlled. The motion accuracy requirement for the nozzle is not high, no complicated machine tool structure is needed, and control difficulty is low. At the same time, the supporting mode can move arbitrarily, not in a fixed form, and is flexible, convenient and applicable to processing of workpieces with different sizes. The magnetorheological fluid is conveniently recovered and can be recycled. The magnetorheological fluid has high damping and can prevent flutter during processing without scratching the surface of the workpiece.

DESCRIPTION OF DRAWINGS

The FIGURE is a schematic diagram of processing of a supporting method for a large thin-walled part.

In the FIGURE: 1 iron core; 2 coil; 3 cutter; 4 workpiece; 5 magnetic particle chain; 6 cured magnetorheological fluid; 7 magnetic particle; 8 magnetorheological fluid; 9 nozzle; 10 collecting box; 11 magnet; 12 hose; 13 hydraulic pump.

DETAILED DESCRIPTION

Specific embodiments of the present invention are described below in detail in combination with the technical solution and accompanying drawings.

A supporting device for a large thin-walled part comprises a processing device, a supporting device and an auxiliary device. A workpiece 4 is positioned between the processing device and the supporting device and is clamped at a periphery in a flexible clamping mode.

The processing device comprises a cutter 3, a coil 2, an iron core 1 and a servo drive device. The cutter moves under the control of the servo drive device according to a processing path to remove the material of the workpiece. The coil 2 plays a role of changing the current magnitude in the coil 2 to accurately control magnetic field intensity to control the magnitude of a supporting force.

The supporting device comprises a nozzle 9, magnetorheological fluid 8, magnetic particles 7, cured magnetorheological fluid 6 and a magnetic particle chain 5. The nozzle 9 is a flow passage of the magnetorheological fluid 8; the nozzle 9 is connected with the servo drive device, and can move in three directions of X, Y and Z to ensure that the supporting device can move with the cutter 3 to offset a milling force, ensure the processing stiffness of the workpiece and reduce processing deformation. The magnetorheological fluid 8 is ejected through the nozzle 9 at certain speed and pressure and has an impact force on the workpiece 4, thereby offsetting most of the milling force. The magnetic particles 7 are dispersed in the magnetorheological fluid 8; the magnetic particles are gathered under the action of a magnetic field force to form the magnetic particle chain 5, so that the magnetorheological fluid 8 is converted into the cured magnetorheological fluid 6; and the cured magnetorheological fluid 6 is near the surface of the workpiece 4 and plays a supporting role on the workpiece 4.

The auxiliary device comprises a collecting box 10, a magnet 11, a hose 12 and a hydraulic pump 13. The collecting box 10 collects the magnetorheological fluid 8 flowing down from the workpiece 4 and splashing in the air. The magnet 11 is used to provide a magnetic field that can attract the magnetorheological fluid 8 into the collecting box 10.

The auxiliary device comprises a collecting box 10, a magnet 11, a hose 12 and a hydraulic pump 13. The collecting box 10 collects the magnetorheological fluid 8 flowing down from the workpiece 4 and splashing in the air. The magnet 11 is used to provide a magnetic field that can attract the magnetorheological fluid 8 into the collecting box 10. The hose 12 can convey the magnetorheological fluid 8 from the collecting box 10 into the nozzle to realize cyclic utilization of the magnetorheological fluid 8. The hydraulic pump 13 injects the magnetorheological fluid 8 into the nozzle 9 at certain speed and pressure.

A supporting method for a large thin-walled part based on the processing device and the supporting device comprises the following steps:

Step 1: setting the magnitude of a jet impact force according to a magnitude of a milling force, so that the jet impact force can offset most of the milling force; wherein the length of the initial segment region of the jet is equal to 100 times of diameter of the nozzle, and obtaining a size of an initial jet area according to the diameter of the nozzle.

Step 2: according to the mutual offset between the sum of the magnetic field force and the jet impact force and the milling force, obtaining the magnitude of a required magnetic field force; designing required magnetic field intensity and current, as well as the number of turns and arrangement mode of the coil 2 according to the magnitude of the magnetic field force; and installing the coil 2 according to the required magnetic field.

Step 3: energizing the coil 2 to generate the magnetic field, and moving the cutter 3 to an initial processing position.

Step 4: controlling the nozzle 9 to move to the other side of the cutter 3 relative to the workpiece 4 through a servo drive mechanism, and ensuring that a distance between the nozzle 9 and the workpiece 4 is within the area of an initial jet segment; starting the hydraulic pump 13 to eject the magnetorheological fluid 8 from the nozzle 9 at certain pressure and speed; then curing the magnetorheological fluid 6 under the action of the magnetic field to support the workpiece 4; installing the magnet 11 on the collecting box 10; and moving the collecting box by the servo drive device to ensure that the collecting box is always under the jet. Step 5: controlling the cutter 3 to conduct processing according to a certain processing track and attitude by the servo drive device, and simultaneously controlling the nozzle 9 to move with the cutter 3 to realize the follow-up support for the workpiece 4.

Step 6: after the end of the processing, deenergizing the coil 2, and moving the cutter 3 to an initial position; and stopping ejecting the magnetorheological fluid 8 by the nozzle 9, while moving to the initial position.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. A supporting device for a large thin-walled part, comprising a processing device and a supporting device, wherein a workpiece is positioned between the processing device and the supporting device;

the processing device comprises a cutter, a coil, and an iron core; the end of the cutter is connected with the iron core; the coil is wound on the iron core; when the coil is energized, a magnetic field is generated around the coil; the current magnitude and winding mode of the coil can be changed to accurately control magnetic field intensity to control the magnitude of a supporting force; a blade part of the cutter is in contact with a processing side of the workpiece to remove the material of the workpiece; the supporting device comprises magnetorheological fluid and cured magnetorheological fluid; the cured magnetorheological fluid is near the surface of the workpiece and plays a supporting role on the workpiece, wherein the device also comprises an auxiliary device; and the workpiece is clamped at a periphery in a flexible clamping mode;

the processing device also comprises a servo drive device; the cutter is connected with the servo drive device and moves under the control of the servo drive device according to a processing path;

the supporting device also comprises a nozzle, magnetic particles, and a magnetic particle chain; the nozzle is located on the other side of the workpiece; a through hole is arranged inside the nozzle to serve as a flow passage of the magnetorheological fluid; the nozzle is connected with the servo drive device, and can move in three directions of X, Y and Z to ensure that the supporting device can move with the cutter and ensure the processing stiffness of the workpiece; the magnetic particles are dispersed in the magnetorheological fluid; the magnetorheological fluid is ejected through the nozzle; when the coil is energized, the magnetic particles in the magnetorheological fluid are gathered under the action of a magnetic field force to form the magnetic particle chain, so that the magnetorheological fluid is converted into the cured magnetorheological fluid;

the auxiliary device comprises a collecting box, a magnet, a hose and a hydraulic pump; the collecting box is located under a jet; the collecting box is connected with the servo drive device, and moves with the nozzle; the collecting box collects the magnetorheological fluid flowing down from the workpiece and splashing in the air; the magnet is located below the collecting box and is used to provide a magnetic field that can attract the magnetorheological fluid into the collecting box; the hose is connected with the collecting box, the hydraulic pump and the nozzle; the magnetorheological fluid is conveyed from the collecting box into the nozzle to realize cyclic utilization of the magnetorheological fluid; and the hydraulic pump is connected with the hose to inject the magnetorheological fluid into the nozzle at certain speed and pressure.

2. A supporting method for a large thin-walled part based on the device of claim 1, comprising the following steps based on the processing device and the supporting device:

step 1: setting the magnitude of a jet impact force of the nozzle according to a magnitude of a milling force, so that the jet impact force can offset most of the milling force; and obtaining a size of an initial jet area according to the diameter of the nozzle;

step 2: according to the mutual offset between the sum of the magnetic field force and the jet impact force and the milling force, obtaining the magnitude of a required magnetic field force;

designing required magnetic field intensity and current, as well as the number of turns and arrangement mode of the coil according to the magnitude of the magnetic field force; and installing the coil according to the required magnetic field;

step 3: energizing the coil to generate the magnetic field, and moving the cutter to an initial processing position;

step 4: controlling the nozzle to move to the other side of the cutter relative to the workpiece through a servo drive mechanism, and ensuring that a distance between the nozzle and the workpiece is within the area of an initial jet segment; starting the hydraulic pump to eject the magnetorheological fluid from the nozzle; then curing the magnetorheological fluid under the action of the magnetic field to support the workpiece;

installing the magnet on the collecting box; and moving the collecting box by the servo drive device to ensure that the collecting box is always under the jet;

step 5: controlling the cutter to conduct processing according to a processing track and attitude by the servo drive device, and simultaneously controlling the nozzle to move with the cutter to realize the moving support for the workpiece;

step 6: after the end of the processing, deenergizing the coil, and moving the cutter to an initial position; closing the hydraulic pump; and stopping ejecting the magnetorheological fluid by the nozzle, while moving to the initial position.

* * * * *